US012176661B2

(12) United States Patent
Chang

(10) Patent No.: US 12,176,661 B2
(45) Date of Patent: Dec. 24, 2024

(54) ELECTRICAL CONNECTOR

(71) Applicant: BIZLINK (KUNSHAN) CO., LTD., Kunshan (CN)

(72) Inventor: Yu Wei Chang, Kunshan (CN)

(73) Assignee: BIZLINK (KUNSHAN) CO., LTD., Kunshan (CN)

( * ) Notice: Subject to any disclaimer, the term of this patent is extended or adjusted under 35 U.S.C. 154(b) by 365 days.

(21) Appl. No.: 17/860,068

(22) Filed: Jul. 7, 2022

(65) Prior Publication Data

US 2023/0011196 A1 Jan. 12, 2023

(30) Foreign Application Priority Data

Jul. 9, 2021 (CN) ......................... 202110778586.4

(51) Int. Cl.

*H01R 3/00* (2006.01)
*H01R 12/71* (2011.01)
*H01R 13/52* (2006.01)
*H01R 13/717* (2006.01)

(52) U.S. Cl.

CPC ....... *H01R 13/7175* (2013.01); *H01R 12/716* (2013.01); *H01R 13/5202* (2013.01); *H01R 13/5216* (2013.01)

(58) Field of Classification Search

CPC .............. H01R 13/7175; H01R 12/716; H01R 13/5202; H01R 13/5216
USPC .......................................................... 439/490
See application file for complete search history.

(56) References Cited

U.S. PATENT DOCUMENTS 8,574,001 B2 11/2013 Lee
2014/0187079 A1* 7/2014 Zien ....................... H01R 35/04 439/640
2022/0140532 A1* 5/2022 Kokovidis ............. A61B 5/273 439/489
2024/0108395 A1* 4/2024 Kühne et al. ...... A61B 18/1206

FOREIGN PATENT DOCUMENTS

CN 209105224 U 7/2019
CN 209169538 U 7/2019
CN 212784087 U 3/2021
TW M397617 U1 2/2011

* cited by examiner

*Primary Examiner* — Phuong K Dinh
(74) *Attorney, Agent, or Firm* — SOROKER AGMON NORDMAN PTE LTD

(57) ABSTRACT

Disclosed is an electrical connector, comprising: a light guiding member, having a light guiding plate, a plurality of light outputting rings and a light incident structure, the plurality of light outputting rings being formed on a front side of the light guiding plate, the light incident structure being formed on a rear side of the light guiding plate and disposed relatively to a center area of the light outputting rings; a plurality of board end receptacles; a front panel, having a plurality of front panel holes, each front panel hole allowing one board end receptacle and one light outputting ring to be embedded therein respectively; and a light source, facing toward a light incident surface of the light incident structure. The electrical connector of the present disclosure provides a plurality of waterproof plug ports with uniform luminescence outer edges.

11 Claims, 7 Drawing Sheets

ELECTRICAL CONNECTOR

TECHNICAL FIELD

The present disclosure relates to the field of electronic equipment, in particular to an electrical connector.

BACKGROUND

As electronic products become thinner and lighter, there are fewer and fewer ports reserved for products, which makes consumers need to purchase hubs (HUBs) to expand the functions of electronic products.

Another application scenario is a vehicle scenario. The driver has a high probability of generating a demand for charging a mobile phone during driving. Therefore, the vehicle hub (HUB) also has considerable market prospects.

In addition to the functional modules of the hub itself, consumers also put forward higher requirements for its aesthetics at the same time. Therefore, the manufacturer of the hub will improve the original product in terms of shape, one of which is to add a light-emitting function for the hub.

However, because the structure of the hub at the plug port is more complex and compact than other areas, a light-transmitting structure is usually provided at the non-plug port of the housing, such as Chinese patents with the number of CN 210579719U, CN210927158U, and a light guiding column is disposed on the surface of the housing as a working status indicator, which obviously cannot guide the user to quickly locate the plug port.

Conventional electrical connector lacks a simple structure with a light-transmitting structure at the plug port.

SUMMARY

The electrical connector of the present disclosure provides a plurality of waterproof plug ports with uniform luminescence outer edges, and has the advantages of simple structure, high tolerance and easy assembly.

According to the subject matter described in present disclosure, an electrical connector is provided, wherein the electrical connector comprises:

- a light guiding member, having a light guiding plate, a plurality of light outputting rings and a light incident structure, the plurality of light outputting rings being formed on a front side of the light guiding plate, the light incident surface being formed on a rear side of the light guiding plate and disposed at a position relative to the center area of the plurality of light outputting rings;
- a plurality of board end receptacles;
- a front panel, having a plurality of front panel holes, each of the plurality of front panel holes allowing one of the board end receptacles and one of the light outputting rings to be embedded therein respectively, each of the plurality of front panel holes being capable of exposing the board end receptacle and the light outputting ring respectively; and
- a light source, facing toward a light incident surface of the light incident structure.

The beneficial effects brought about by the technical solution provided by the present disclosure are as follows:

a. a plurality of waterproof plug-in ports with uniform luminescence outer edges is provided on an electrical connector;

b. it has the advantages of simple structure, high tolerance and easy assembly.

BRIEF DESCRIPTION OF THE DRAWINGS

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

DETAILED DESCRIPTION

Figure 1:
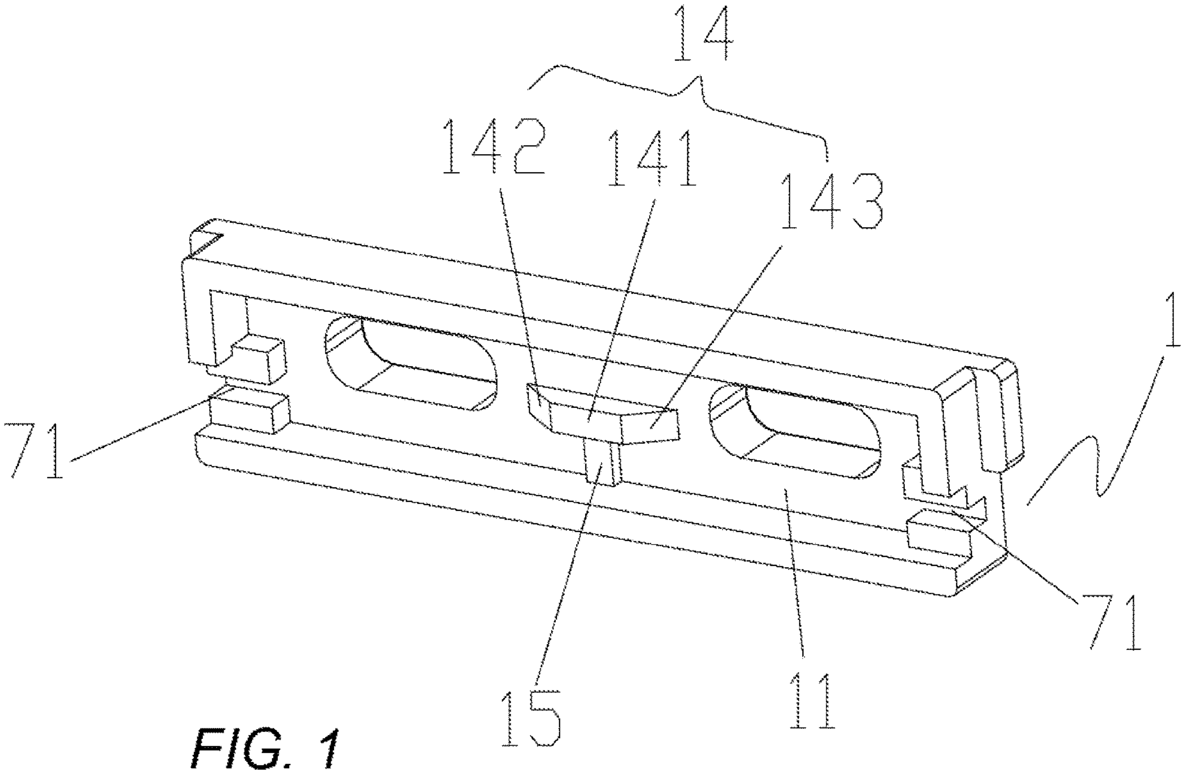
FIG. 1 is a schematic rear three-dimensional diagram of a light guiding member of an electrical connector provided by an embodiment of the present disclosure.

In order to enable those skilled in the art to better understand the solutions of the present disclosure, embodiments will be described in detail with reference to the drawings. The same or corresponding parts are denoted by the same symbols in the drawings, and description thereof will not be repeated. Apparently, the embodiments described below are merely a part of the embodiments of the present disclosure, not all the embodiments. Based on the embodiments of the present disclosure, all other embodiments obtained by one of ordinary skill in the art without creative work fall within the protective scope of the present disclosure.

It should be noted that terms "first", "second" and the like in the description, the claims and the accompanying drawings of the present disclosure are used to distinguish similar objects, and do not have to be used to describe a specific order or sequence. It should be understood that the data so used can be interchanged under appropriate circumstances so that the embodiments of the present disclosure described herein can be implemented in an order other than those illustrated or described herein. In the description and claims of the present disclosure, the term "comprising/including/having parts A" or "comprising/including/having a part A" can be understood as the number of parts A can be at least one and may be two or more on the premise that there is no conflict with the content of the original description. In addition, the terms "comprise", "contain" and "have" in the description and claims of the present disclosure and any variations thereof are intended to cover non-exclusive inclusions, for example, processes, methods, devices, products or equipment that include a series of steps or units are not necessarily limited to those clearly listed steps or units, but may include other steps or units not explicitly listed or inherent to these processes, methods, products or equipment. In addition, the terms such as "front/front side", "rear/rear side". "left/left side", "right/right side", "upper/upper side", "lower/lower side" are used only to provide a description of the relative relationship of the respective elements, and do not limit the application direction of each element.

In an embodiment of the present disclosure, an electrical connector is provided as a USB HUB for vehicles, which can be applied to the pre-installation market of vehicles that are delivered from a factory or the after-installation market of vehicles that are not delivered from a factory. Obviously, the USB HUB for vehicles is only one example of the application of the electrical connector in this embodiment, and can also be used with electronic digital products such as notebooks, and its specific application is not a basis for limiting the protection scope of the present disclosure. The electrical connector of an embodiment of the present disclosure provides a plurality of waterproof plug ports with uniform luminescence outer edges; and the electrical connector has the advantages of simple structure, high acceptable tolerance and easy assembly.

Referring to FIGS. 1 to 8, in this embodiment, the electrical connector mainly comprises components such as a light guiding member 1, a circuit board 21, an outer frame 3, a rear housing 4, a front panel 5, a first sealing member 61, a second sealing member 62 and the third sealing member 8. The details are as follows.

The design of the light guiding member 1 will be described below.

Figure 3:
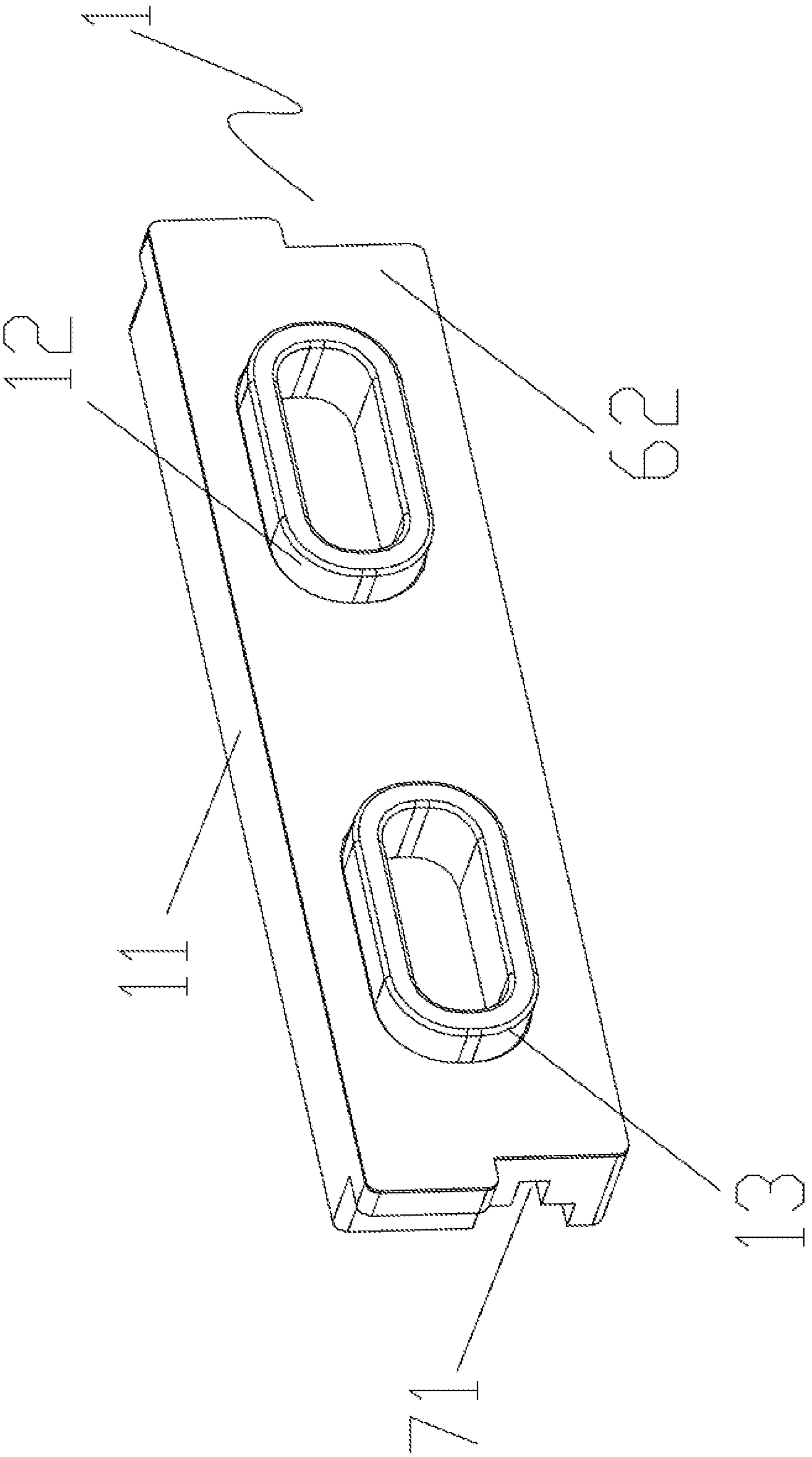
FIG. 3 is a schematic front three-dimensional diagram of a light guiding member of an electrical connector provided by an embodiment of the present disclosure.

Referring to FIGS. 1 and 3, the light guiding member 1 is made of a light guiding material, and comprises a light guiding plate 11 and two light outputting rings, which are respectively a first light outputting ring 12 and a second light outputting ring 13, the first light outputting ring 12 and the second light outputting ring 13 are respectively formed by protruding from a front side of the light guiding plate 11, that is, the first light outputting ring 12 and the second light outputting ring 13 are respectively one piece formed with the light guiding plate 11, and the inner regions of the first light outputting ring 12 and the second light outputting ring 13 form through holes of the light guiding plate 11; the front side is an end face of the light guiding member 1 facing forward, and a rear side of the light guiding plate 11 is an end face facing the rear. The rear side of the light guiding plate 11 is provided with a light incident structure 14 at a position relative to the center of the first light outputting ring 12 and the second light outputting ring 13, the center in the previous sentence can be understood that the light incident structure 14 is located at the middle area between the two through holes corresponding to the first light outputting ring 12 and the second light outputting ring 13 on the rear side of the light guiding plate 11, as shown in FIG. 1, or located at the center area among more than two through holes corresponding to more than two light outputting rings.

The light incident structure 14 is provided with a light incident surface 141, in this embodiment, the light incident surface 141 of the light incident structure 14 is flat, but it can also be an arc structure. In addition to the light incident surface 141, the light incident structure 14 also comprises a first side bevel 142 and a second side bevel 143, and as shown in FIG. 1, corresponding to the arrangement of the first light outputting ring 12 and the second light outputting ring 13 along the length direction of the light guiding plate 11, the first side bevel 142 and the second side bevel 143 are respectively inclined to the left and right sides in the length direction of the light guiding plate 11. The first side bevel 142 and the second side bevel 143 are respectively disposed on the two sides of the light incident surface 141 and face different light outputting rings respectively, wherein, the first side bevel 142 is inclined from the light incident surface 141 in the direction close to the first light outputting ring 12 and is connected to the rear side, the second side bevel 143 is inclined from the light incident surface 141 in the direction close to the second light outputting ring 13 and is connected to the rear side, so that after the light emitted by a light source 22 enters the light incident surface 141, the light can be directed to the first light outputting ring 12 and the second light outputting ring 13 through the first side bevel 142 and the second side bevel 143 respectively, which effectively improves the uniform light effect of the light outputting rings.

Especially for the case where the shapes of the first light outputting ring 12 and the second light outputting ring 13 are exactly the same, the first side bevel 142 and the second side bevel 143 are configured to form an isosceles trapezoid three-dimensional structure with the light incident surface 141 protruding from the rear side of the light guiding plate 11 and tapering inwardly; relative to the starting side as the rear side of the light guiding plate 11, the light incident surface 141 is located at the terminal side of the isosceles trapezoid three-dimensional structure.

Figure 2:
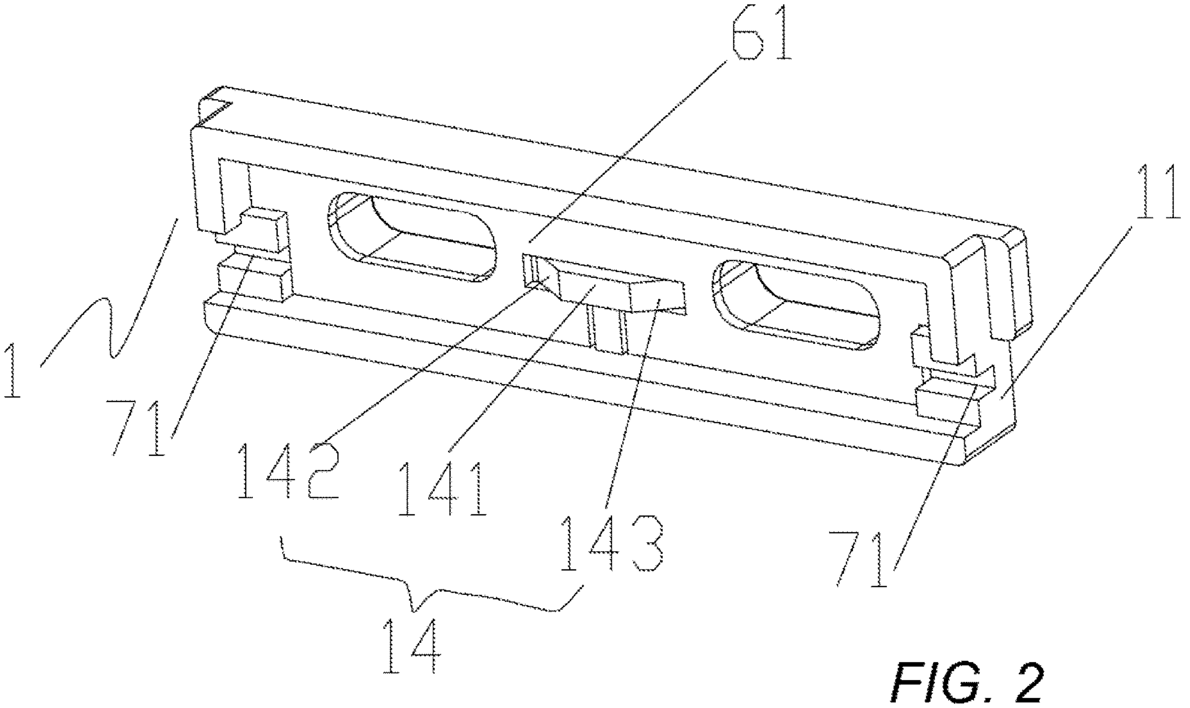
FIG. 2 is a schematic structure diagram of the light guiding member covering the first sealing member on the inner side in FIG. 1.

Further, referring to FIGS. 1 and 2, the rear side of the light guiding plate 11 is further provided with an auxiliary light guiding structure 15, which is disposed adjacent to the light incident structure 14. In addition, the auxiliary light guiding structure 15 is formed by protruding from the rear side of the light guiding plate 11 and tapering outward, that is, the auxiliary light guiding structure 15 also has two bevels at the left and right side, and the protruding height of the auxiliary light guiding structure 15 relative to the rear side of the light guiding plate 11 is lower than the protruding height of the light incident structure 14 relative to the rear side of the light guiding plate 11; the upper end of the auxiliary light guiding structure 15 is connected to the middle of the light incident structure 14, and the length direction of the auxiliary light guiding structure 15 intersects with the length direction of the light incident structure 14 to form a T shape. In addition, since the auxiliary light guiding structure 15 also has two bevels at the left and right side, after the incident light is introduced into the auxiliary light guiding structure 15 through the light incident structure 14, it can also be directed to the corresponding light outputting rings through the bevels of the auxiliary light guiding structure 15 on the two sides respectively, which improves the uniform light effect of the light outputting rings. In this embodiment, the auxiliary light guiding structure 15 is only located below the light incident structure 14, but, if necessary, another same auxiliary light guiding structure 15 can be provided at the upper position to form a cross shape to further improve the uniform light effect.

In addition, referring to FIGS. 1 and 3, each of the left and right sides of the light guiding plate 11 is provided with a first carrying slot 71, which extends horizontally in the left-right direction, respectively, for supporting and carrying the circuit board 21. The light guiding member 1 is provided to be mirrored left and right.

The design of the circuit board 21 will be described below.

Figure 4:
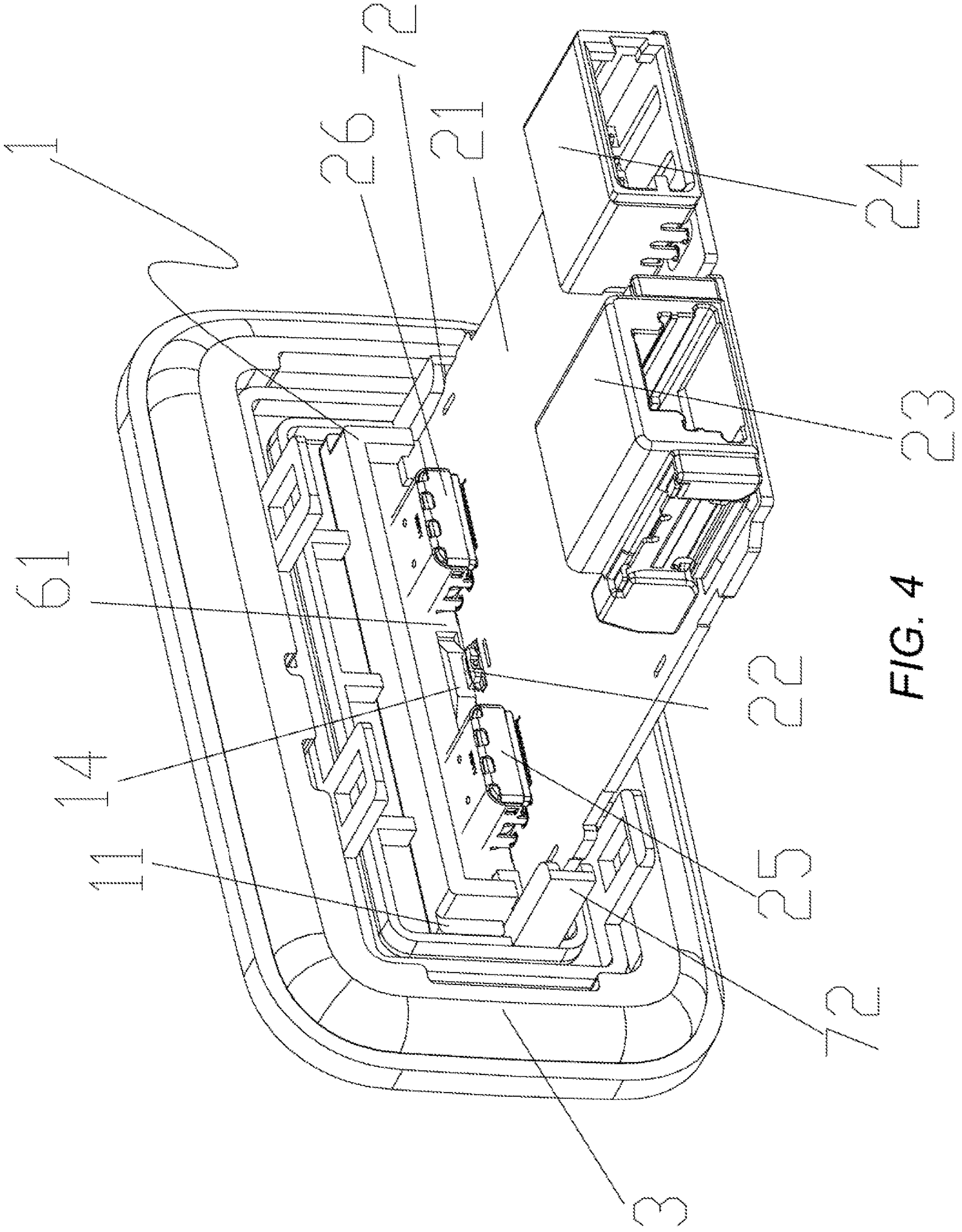
FIG. 4 is a schematic rear three-dimensional diagram of an electrical connector with housing disassembled provided by an embodiment of the present disclosure.
Figure 5:
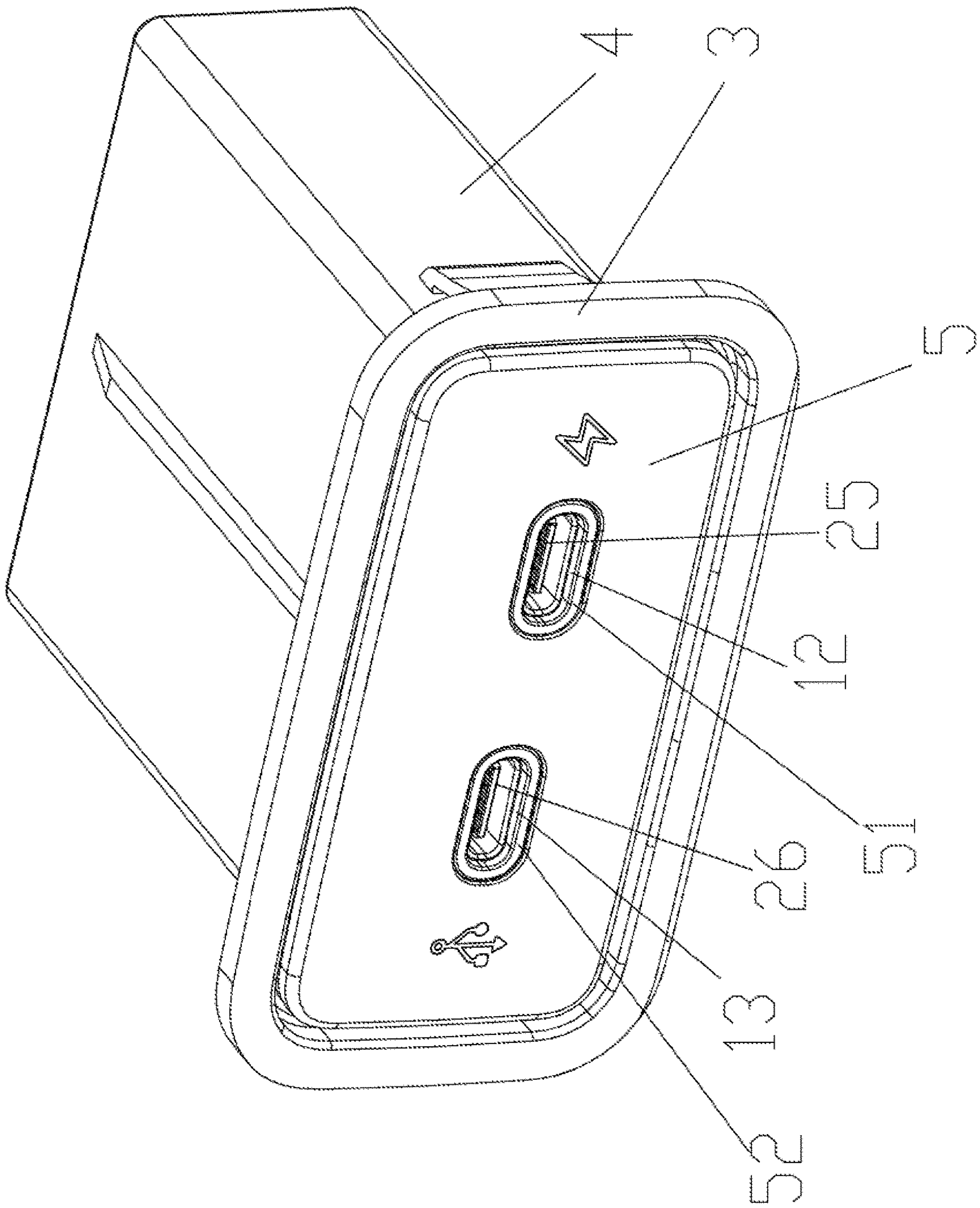
FIG. 5 is a schematic front three-dimensional diagram of an electrical connector provided by an embodiment of the present disclosure.

Referring to FIG. 4, the circuit board 21 can be a PCB circuit board, and two waterproof board end receptacles are welded at the front edge of the circuit board 21, referring to FIG. 4 and FIG. 5, the two board end receptacles are a first board end receptacle 25 and a second board end receptacle 26. In this embodiment, the two waterproof board end receptacles are the same, which are the female board end receptacle corresponding to USB 3.0 TYPE C (USB Type-C Female PCB Mount), but the form of the receptacles is not limited in the present disclosure, when necessary, the specifications of the two board end receptacles can be different, for example, the two board end receptacles can use different USB or other different receptacle protocols, or, one is only for power supply, and the other has a signal transmission function and a power supply function. FIGS. 1 to 8 of this application are drawn in real scale, considering that the size of the circuit board in the board end receptacle of USB 3.0 TYPE C is fixed, although the dimensions of each element are not described in detail, their dimensions are inherently disclosed in FIGS. 1 to 8 and should be directly and accurately known without ambiguity and should be considered part of the content of this specification.

Referring to FIG. 4, a light source 22 is welded in the middle of the two waterproof board end receptacles, the light source 22 can be various light-emitting elements, and the light source 22 is preferably an LED, and its light emitting angle is not limited, and the light emitting angle of the LED in this embodiment is selected within the range of 130°±5°.

Figure 6:
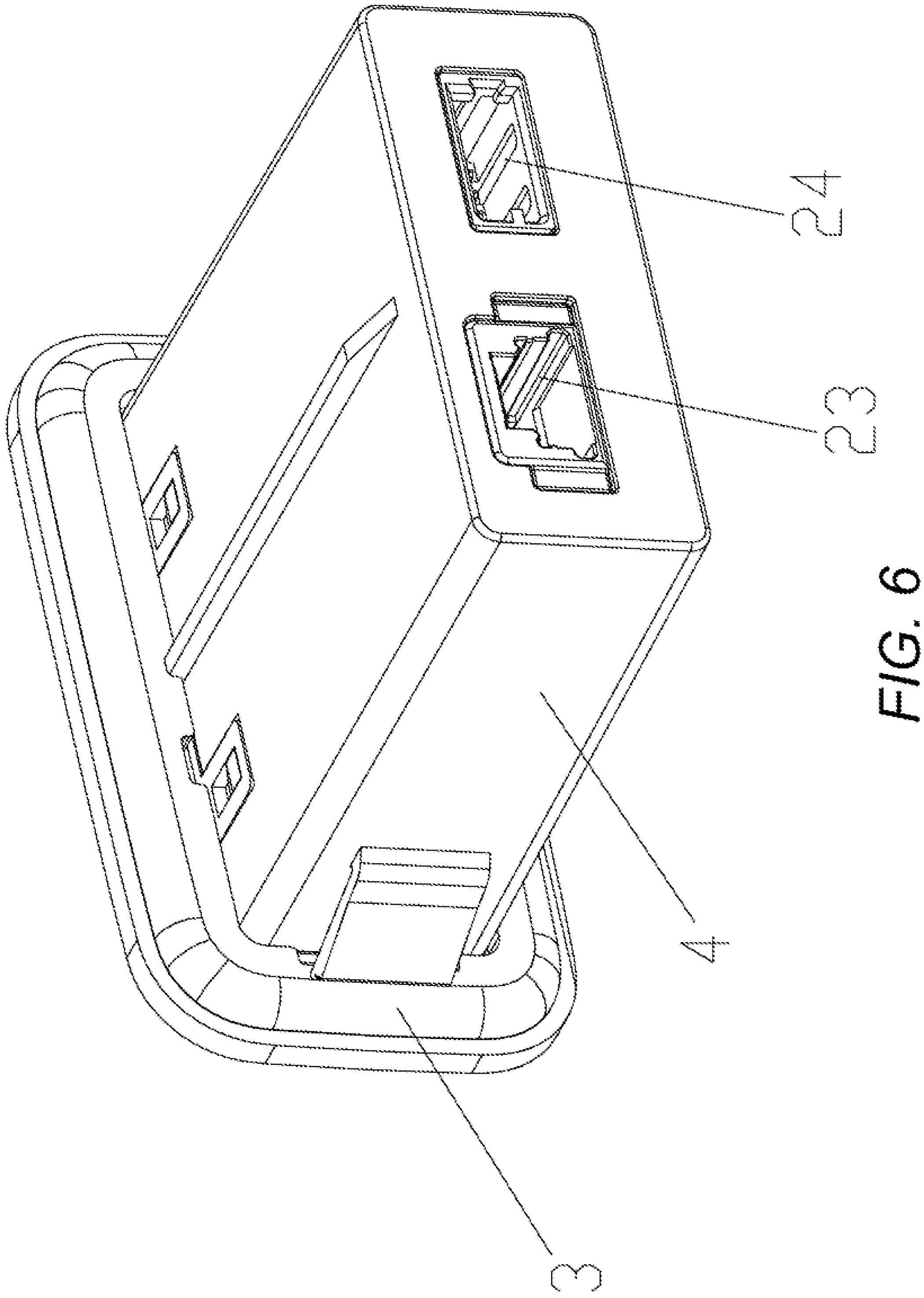
FIG. 6 is a schematic rear three-dimensional diagram of an electrical connector provided by an embodiment of the present disclosure.

In addition, referring to FIG. 4 and FIG. 6, the rear edge of the circuit board 21 is welded with two connecting ports: the two connecting ports comprise a first connecting port 23 and a second connecting port 24, which are preferably welded on a side different from the side where the two board end receptacles are located, for example, the two board end receptacles are welded on the front side of the circuit board 21, and the two connecting ports are welded on the rear side of the circuit board 21, the electrical connector in the embodiment of the present disclosure may be a USB HUB for vehicles, correspondingly, the two connecting ports may be connecting ports of the same function type, or may be connecting ports of different function types, for instance, the first connecting port 23 is configured to only allow power transmission (for example, using the power signal of the vehicle system to charge a mobile phone), and the second connecting port 24 is configured to allow signal transmission (such as the transmission of pictures or music files from the mobile terminal to the vehicle system).

The design of the front panel 5 will be described below.

Referring to FIG. 5, the front panel 5 is a type of rectangular plate-shaped element, and the front panel 5 can be selectively made of light-conductive or non-light-conductive materials; in this embodiment, the front panel 5 is made of non-light-conductive (opaque) materials. The front panel 5 is provided with two front panel holes penetrating the front and rear surfaces of the front panel 5, which are respectively a first front panel hole 51 and a second front panel hole 52. Referring to FIG. 5, the first front panel hole 51 and the second front panel hole 52 are horizontally disposed in the left-right direction along the length direction of the connector and are located at the same height. In addition, referring to FIG. 4, the side edges on the left and right sides of the rear surface of the front panel 5 are respectively provided with a second carrying slot 72 at the same height, which is column-shaped three-dimensional structures with a C-shaped cross-section extending backward, and the circuit board 21 can be horizontally inserted forward and aligned and holded at the notch of the second carrying slot 72.

The connection relationship and operation principle of the respective elements will be described below.

Figure 7:
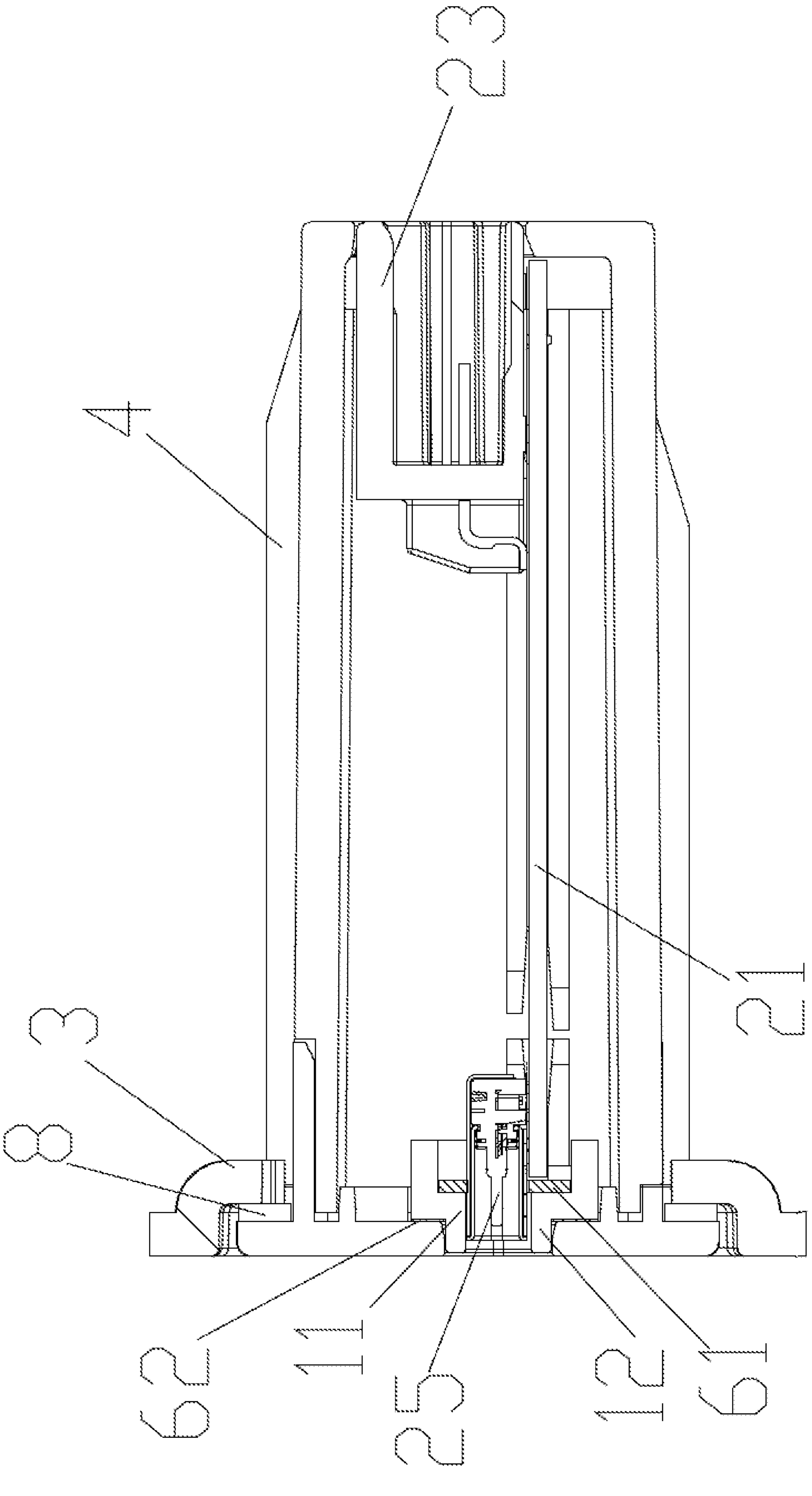
FIG. 7 is a schematic side cross-sectional diagram of an electrical connector at a first board end receptacle provided by an embodiment of the present disclosure.

Referring to FIGS. 5 and 7, the light outputting side of the first light outputting ring 12 is exposed through the first front panel hole 51 of the front panel 5, the light outputting side of the second light outputting ring 13 is exposed through the second front panel hole 52 of the front panel 5, that is, each of the plurality of front panel holes is capable of exposing the light outputting ring; the "expose" here does not mean that the first light outputting ring 12 and the second light outputting ring 13 protrude from the front surface of the front panel 5, but indicates that the first light outputting ring 12 and the second light outputting ring 13 are not covered or can be observed/visible from the front viewing angle of the electrical connector (e.g. the viewing angle of FIG. 5), and regardless of whether the first light outputting ring 12 and the second light outputting ring 13 protrude from the front surface of the front panel 5 or are flush with the front surface of the front panel 5, or even slightly retractive within the front surface of the front panel 5 under the premise of being observed, all of which belong to the protection scope claimed in the present disclosure.

Wherein, the front panel 5 is made of non-light-conductive material, and the light guiding member 1 is made of light guiding material, therefore, the light emitted by the light source 22 can enter the light guiding member 1 and pass through the first light outputting ring 12 and the second light outputting ring 13 and come out from the front surface of the front panel 5 of the electrical connector, that is, halos around the outer edges of the two board end receptacles are formed, which improves the aesthetics and guides the user to accurately and quickly complete the insertion operation of the electrical connection in a dark environment.

Figure 8:
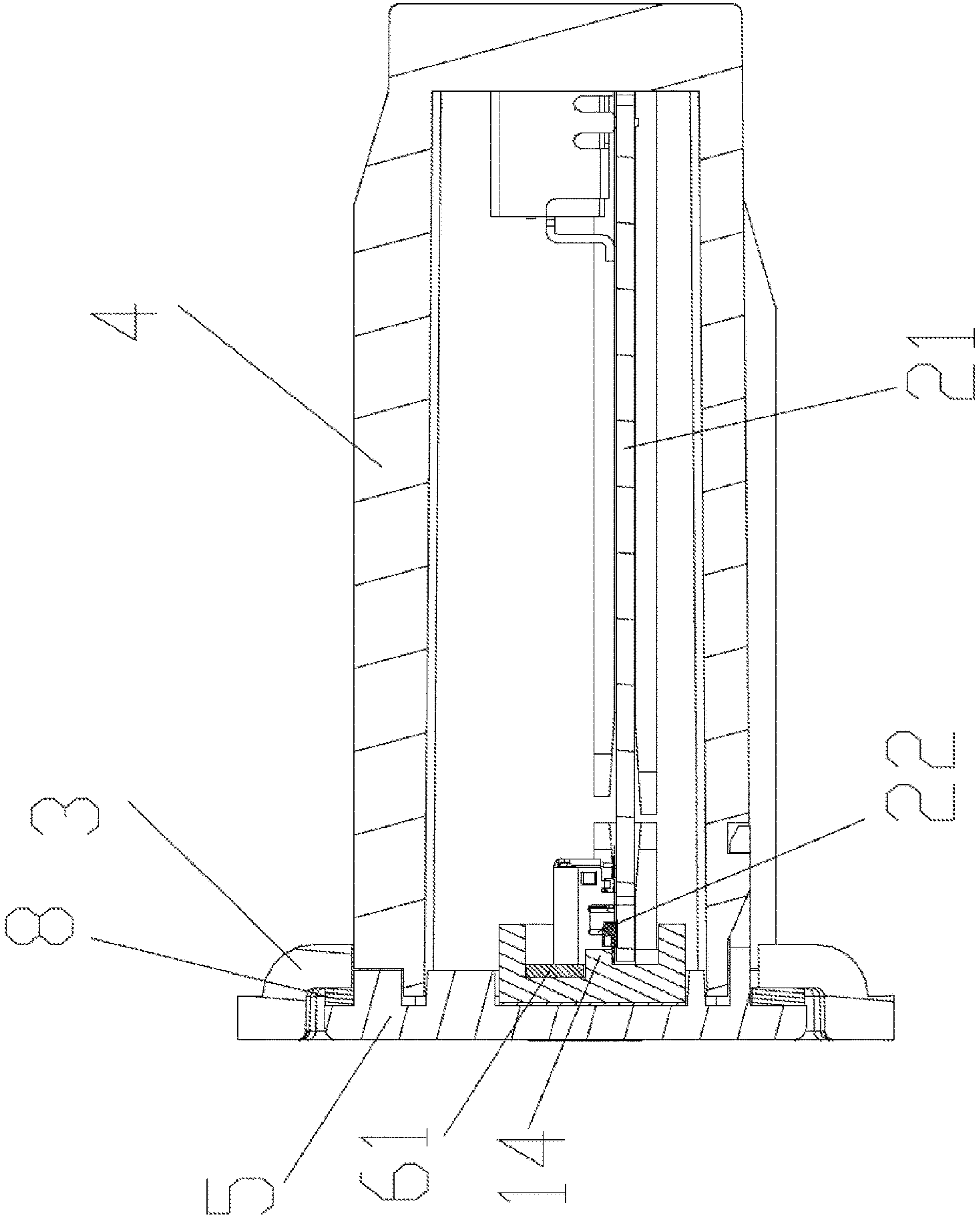
FIG. 8 is a schematic side cross-sectional diagram of an electrical connector at a non-board end receptacle position provided by an embodiment of the present disclosure.

Referring to FIG. 4 and FIG. 8, the light source 22 is disposed relatively to the light incident surface 141 of the light incident structure 14, preferably, the light-emitting surface of the light source 22 is arranged relatively to the light incident surface 141; preferably, the shortest distance between the light-emitting surface of the light source 22 and the light incident surface 141 is greater than or equal to 0.2 mm and less than 10 mm, and the design of this reserved space allows the light source 22 to be welded on the circuit board 21 in advance, and then assembled with the light guiding member 1, so as to prevent the light source 22 from interfering with the light incident surface 141 due to welding or component dimensional tolerances, thereby providing a larger acceptable tolerance. That is, the minimum distance between a light outputting side of the light source and the light incident surface of the light incident structure is greater than or equal to 0.2 mm, so as to allow the LED light source to be welded on the circuit board in advance, and then assembled with the light guiding member, even if there is a large mounting tolerance, the effect will not be affected.

Referring to FIG. 4, the left and right sides of the front panel 5 are both provided with a second carrying slot 72, the left and right sides of the front end of the circuit board 21 are respectively installed in the first carrying slots 71 on the left and right sides of the light guiding plate 11, and the front ends of the left and right sides of the circuit board 21 are respectively installed in the second carrying slots 72 on the left and right sides of the front panel 5; the first carrying slots 71 and the second carrying slots 72 are respectively used to support(hold) the front end of the circuit board 21, and referring to FIG. 7, the inner rear portion of the rear housing 4 is further provided with a support block for supporting the rear portion of the circuit board 21; preferably, the width of the first carrying slots 71 and/or the second carrying slots 72 is adapted to the thickness of the circuit board 21, so that the circuit board 21 can be inserted and fitted with it to achieve installation without additional fastener.

Referring to FIG. 4 and FIG. 5, the two board end receptacles are respectively a first board end receptacle 25 and a second board end receptacle 26, as shown in FIG. 5 and FIG. 7, the first board end receptacle 25 is exposed through the (hole of) the first light outputting ring 12, the second board end receptacle 26 is exposed through the (hole of) the second light outputting ring 13, that is, each of the plurality of front panel holes is capable of exposing the board end receptacle; the "expose" here is similar to that mentioned above, and regardless of whether the first board end receptacle 25 and the second board end receptacle 26 protrude from the front surface of the front panel 5 or are flush with the front surface of the front panel 5, or even slightly retractive within the front surface of the front panel 5 under the premise of being observed, all of which belong to the protection scope claimed in the present disclosure.

Referring to FIG. 4 and FIG. 6, the two connecting ports are respectively a first connecting port 23 and a second connecting port 24, which are preferably welded on a side different from the side where the two board end receptacles are located, for example, the two board end receptacles are welded on the front side of the circuit board 21, and the two connecting ports are welded on the rear side of the circuit board 21, correspondingly, two holes are provided on the rear side of the rear housing 4 for exposing at least part of the first connecting port 23 and the second connecting port 24, the "exposing" here is similar to that mentioned in the light outputting rings and board end receptacles above, and regardless of whether the first connecting port 23 and the second connecting port 24 protrude from the rear surface of the rear housing 4 or are flush with the rear surface of the rear housing 4, or even slightly retractive within the rear surface of the rear housing 4 under the premise of being observable, all of which belong to the protection scope claimed in the present disclosure.

Furthermore, referring to FIG. 2, the inner side surface of the light guiding plate 11 is covered with a first sealing member 61. The first sealing member 61 is, for example, a waterproof rubber gasket, which can be used to fill the gap between the board end receptacles and the light guiding plate 11, and can provide waterproof performance thereby. At the same time, the first sealing member 61 is a low light transmittance element to absorb light leakage from the light guiding plate 11, and the first sealing member 61 is further provided with an avoiding hole corresponding to the light incident structure 14 to allow light from the light source 22 to enter the light incident structure 14. The low transmittance element in this embodiment is defined as light transmittance less than 50%, namely the ratio of the remaining luminous flux (LM) to the original luminous flux (LM) after light passes through the element is less than 50%. In this embodiment, the light transmittance of the first sealing member 61 is less than 20%, and the light transmittance can also be adjusted to be less than or equal to 10%, 5% or 1% to obtain better light insulation effect.

In addition, referring to FIG. 3, the second sealing member 62 is attached to the front surface of the light guiding plate 11, and the second sealing member 62 is mainly used as a waterproof glue layer and an adhesive glue layer. The second sealing member 62 can be a double-sided adhesive layer (for example, VHB tape with higher viscosity), and the second sealing member 62 comprises two waterproof holes for avoiding the first light outputting ring 12 and the second light outputting ring 13, so as to allow the first board end receptacle 25 and the second board end receptacle 26 to pass through the waterproof holes. That is, except for the two holes, the second sealing member 62 completely covers the front end surface of the light guiding plate 11 and the outer contour of the second sealing member 62 corresponds to the outer contour of the light guiding plate 11. The second sealing member 62 is disposed on the vertical surface between the light guiding plate 11 and the front panel 5, as shown in FIG. 7, thereby achieving the effect of joining, adhering and fixing the light guiding plate 11 and the front panel 5. The first sealing member 61 and the second sealing member 62 are both sheet-like structures, and waterproof assembly can be achieved without dispensing glue or precise alignment. Compared with glue dispensing, the advantage of using a pre-formed waterproof glue layer in this embodiment is that it can be directly socketed during assembly, thereby reducing errors in gluing by personnel, reducing tolerances and increasing assembly efficiency.

In this embodiment, the electrical connector further comprises an outer frame 3, which is fixed to the rear housing 4 and connected to the front panel 5 via a third sealing member 8, the third sealing member 8 shown may be an annular side waterproof glue strip, and its design and effect are similar to those of the second sealing member 62, so it will not be repeated.

In addition to the aforementioned embodiments, the light incident surface 141 may be further provided with a groove (not shown), preferably surrounded by more than three sides, when the circuit board 21 is inserted into the first carrying slot 71 and the second carrying slot 72, the power source 22 enters the groove to further reduce the loss of incoming light; the thicknesses of the first carrying slot and the second carrying slot are adapted to the thickness of the circuit board, so that the circuit board can be assembled by plugging, which reduces the difficulty of assembling and improves the assembling efficiency. In addition, the numbers of the front panel holes, the light outputting rings, and the board end receptacles are not limited at two, if necessary, there may be four disposed in an array (not shown). Correspondingly, the light incident structure 14 is arranged on the inner side of the light guiding plate 11 at a position corresponding to the center of the array of the light outputting rings, and the number of side bevels of the light incident structure 14 can be four (not shown), in particular, the light incident surface 141 is inclined to the upper left, lower left, upper right and lower right directions respectively. The present disclosure does not limit the number of the front panel holes and light outputting rings at two or four, as long as the light outputting rings are disposed on the outside of the light guiding plate 11 corresponding to the area with the light incident structure 14 as the geometric center, and the side bevels of the light incident structure 14 are provided to be inclined in a direction from the light incident surface 141 to each light outputting ring, no matter the number of front panel holes and the number of light outputting rings is three, five or eight, it is the technical solution claimed in the present disclosure. In addition, as in the embodiment shown in FIG. 1, the first light outputting ring 12 and the second light outputting ring 13 can achieve basic light outputting and uniform light effects with only one light source 22, however, when higher requirements on light uniformity are required, additional light incident structures 14 and light sources 22 can be provided on each edge or end sides of the light guiding member 1 respectively, that is, the present disclosure is not limited to a single light source.

The above are only specific implementations of the current application, and it should be noted that, for those ordinary skilled in the art, any improvements or modifications without depart from the technical principles of the present application can be made, and should be covered by the protective scope of the present application.

What is claimed is:

1. An electrical connector, comprising:

a light guiding member, having a light guiding plate, a plurality of light outputting rings and a light incident structure, the plurality of light outputting rings being formed on a front side of the light guiding plate, the light incident structure being formed on a rear side of the light guiding plate and disposed at a position relative to a center area of the plurality of light outputting rings;

a plurality of board end receptacles;

a front panel, having a plurality of front panel holes, each of the plurality of front panel holes allowing one of the board end receptacles and one of the light outputting rings to be embedded therein respectively, each of the plurality of front panel holes being capable of exposing at least a part of the board end receptacle and at least a part of the light outputting ring respectively; and a light source, facing toward a light incident surface of the light incident structure.

2. The electrical connector according to claim 1, wherein the light incident structure comprises the light incident surface, at least a first side bevel and a second side bevel, wherein the first side bevel and the second side bevel are respectively disposed on two sides of the light incident surface and face different light outputting rings respectively.

3. The electrical connector according to claim 2, wherein the first side bevel and the second side bevel are configured to be inclined respectively to the two sides in length direction of the light guiding plate, and together with the light incident surface, form an isosceles trapezoid structure that protrudes and tapers from the rear side of the light guiding plate;

the light incident surface is located at a terminal end of the isosceles trapezoid structure.

4. The electrical connector according to claim 2, wherein the electrical connector further comprises a first sealing member, which covers an inner side of the light guiding plate and fills a gap between the board end receptacles and the light guiding plate;

the first sealing member is provided with an avoiding hole to allow light of the light source to enter the light incident structure.

5. The electrical connector according to claim 4, wherein light transmittance of the first sealing member is less than 50%.

6. The electrical connector according to claim 5, wherein the electrical connector further comprises a second sealing member disposed between the light guiding plate and the front panel;

the second sealing member is a waterproof glue layer, and configured for bonding the light guiding plate and the front panel; wherein the waterproof glue layer comprises a plurality of waterproof holes to allow the plurality of light outputting rings and the plurality of board end receptacles to pass through the plurality of waterproof holes.

7. The electrical connector according to claim 1, wherein the electrical connector further comprises a circuit board, and the light source and the plurality of board end receptacles are welded on the circuit board.

8. The electrical connector according to claim 7, wherein minimum distance between a light outputting side of the light source and the light incident surface of the light incident structure is greater than or equal to 0.2 mm.

9. The electrical connector according to claim 7, wherein the electrical connector further comprises an outer frame, a rear housing and a plurality of connecting ports, and the plurality of connecting ports are welded to the circuit board;

the outer frame is fixed with the rear housing and connected to the front panel via a third sealing element, an end face of the rear housing away from the front panel is provided with a plurality of holes for exposing at least a part of the plurality of connecting ports.

10. The electrical connector according to claim 9, wherein the connecting ports comprise a first connecting port and a second connecting port, wherein the first connecting port is configured for signal transmission, and the second connecting port is configured for only power transmission.

11. The electrical connector according to claim 7, wherein the light guide member is provided with a first carrying slot, or the front panel is provided with a second carrying slot;

the first carrying slot or the second carrying slot are respectively configured to support the circuit board.

* * * * *